United States Patent [19]
Helmsderfer

[11] Patent Number: 5,960,820
[45] Date of Patent: *Oct. 5, 1999

[54] COVER ASSEMBLY HAVING RAPID INSTALLATION FEATURES FOR COVERING UNDERSINK PIPING

[76] Inventor: John A. Helmsderfer, 2151 Luray Ave., Cincinnatti, Ohio 45206

[*] Notice: This patent is subject to a terminal disclaimer.

[21] Appl. No.: 08/933,718

[22] Filed: Sep. 19, 1997

Related U.S. Application Data

[60] Division of application No. 08/742,507, Nov. 1, 1996, Pat. No. 5,701,929, and a continuation-in-part of application No. 08/675,779, Jul. 15, 1996, Pat. No. 5,649,566, which is a division of application No. 08/271,439, Jul. 7, 1994, Pat. No. 5,586,568, said application No. 08/742,507, is a continuation-in-part of application No. 08/735,132, Oct. 22, 1996, Pat. No. 5,699,828, which is a continuation-in-part of application No. 08/490,599, Jun. 6, 1995, Pat. No. 5,685,328, which is a continuation-in-part of application No. 08/337,971, Nov. 14, 1994, Pat. No. 5,564,463, which is a continuation-in-part of application No. 08/271,439, Jul. 7, 1994, Pat. No. 5,586,568, which is a continuation-in-part of application No. 08/146,999, Oct. 29, 1993, Pat. No. 5,341,830.

[51] Int. Cl.$^6$ ..................................................... F16L 59/18
[52] U.S. Cl. ..................... 137/375; 137/247.49; 137/797; 138/155; 138/159; 138/120; 138/178; 285/47
[58] Field of Search ................................ 137/375, 247.49, 137/797; 285/45, 47; 138/155, 157, 158, 159, 160, 161, 120, 178

[56] References Cited

U.S. PATENT DOCUMENTS

| | | | |
|---|---|---|---|
| 313,958 | 3/1885 | Seymour | 138/158 |
| 411,115 | 8/1889 | Wendell | 138/159 |
| 438,507 | 10/1890 | Tracey | 285/47 |
| 1,771,134 | 7/1930 | Morgan | 285/47 |
| 1,814,134 | 7/1931 | Eige | 138/40 |
| 2,078,606 | 4/1937 | Le Grand | |
| 2,140,308 | 12/1938 | Belshaw | 285/47 X |
| 2,449,265 | 9/1948 | Williams | |
| 2,650,180 | 8/1953 | Walker | 137/375 |
| 2,761,949 | 9/1956 | Colton | 285/47 X |
| 2,841,203 | 7/1958 | Gronemeyer | 138/160 X |
| 2,937,662 | 5/1960 | Green | 285/47 |
| 2,964,064 | 12/1960 | Jones | 285/47 |
| 3,014,827 | 12/1961 | Clinchy et al. | 138/161 |
| 3,102,740 | 9/1963 | Plummer | 285/47 |
| 3,153,546 | 10/1964 | Dunn | 285/47 |
| 3,172,377 | 3/1965 | Dewar | 137/797 X |
| 3,402,731 | 9/1968 | Martin | 137/375 |
| 3,425,456 | 2/1969 | Schibig | 137/375 |
| 3,556,158 | 1/1971 | Schneider | 138/156 |
| 3,559,694 | 2/1971 | Volberg | 285/47 X |
| 3,598,157 | 8/1971 | Farr | 138/157 |
| 3,650,299 | 3/1972 | Seiler et al. | 138/149 |
| 3,790,418 | 2/1974 | Huvey et al. | 137/375 X |
| 3,801,140 | 4/1974 | Keller | 285/47 |
| 3,804,438 | 4/1974 | Humphries et al. | 285/47 |
| 3,960,181 | 6/1976 | Baur et al. | 138/178 |

(List continued on next page.)

FOREIGN PATENT DOCUMENTS

| | | | |
|---|---|---|---|
| 1249974 | 2/1989 | Canada . | |
| 2714576 | 10/1978 | Germany . | |
| 4201 | 4/1899 | United Kingdom | 138/158 |

*Primary Examiner*—John Rivell
*Attorney, Agent, or Firm*—Wood, Herron & Evans, LLP

[57] ABSTRACT

An insulative cover assembly for insulating a P-trap drain piping assembly comprises a unitary body including a first section and a second section joined together at a third section, the first section having an body configured to cover a pipe and having a first end, and the second section having a body configured to cover a pipe and having a first end. The third section couples second ends of each of the first and second sections together and comprises a structurally weakened area therein which is manually separateable for forming first and second cover pieces from said unitary body. The ends of the separated first and second sections further include structurally weakened areas for trimming the lengths of the sections during installation whereby the piping assembly is quickly and efficiently covered and insulated generally without the need for special installation tools.

20 Claims, 1 Drawing Sheet

U.S. PATENT DOCUMENTS

| | | | |
|---|---|---|---|
| 4,046,406 | 9/1977 | Press et al. | 285/47 |
| 4,084,842 | 4/1978 | Stonitsch et al. | 285/47 |
| 4,327,778 | 5/1982 | Williams | 138/149 |
| 4,416,309 | 11/1983 | Salim | 138/104 |
| 4,441,743 | 4/1984 | Steenbergen | 285/45 X |
| 4,463,780 | 8/1984 | Schultz et al. | 138/178 |
| 4,465,307 | 8/1984 | de Lange | 285/47 |
| 4,473,244 | 9/1984 | Hill | 137/375 X |
| 4,484,386 | 11/1984 | Stonitsch | 285/47 X |
| 4,516,278 | 5/1985 | Lamond | 4/679 |
| 4,594,740 | 6/1986 | Tseronakis | 137/247.35 X |
| 4,595,615 | 6/1986 | Cohen | 138/155 X |
| 4,667,505 | 5/1987 | Sharp | 138/161 X |
| 4,669,509 | 6/1987 | Botsolas | 138/178 |
| 4,705,302 | 11/1987 | Beiley | 285/47 X |
| 4,746,147 | 5/1988 | Walker | 285/47 X |
| 4,804,210 | 2/1989 | Hancock | 285/47 |
| 4,830,060 | 5/1989 | Botsolas | 138/149 |
| 4,838,318 | 6/1989 | Karakawa | 138/166 |
| 4,840,201 | 6/1989 | Botsolas | 138/178 |
| 4,930,543 | 6/1990 | Zuiches | 138/110 |
| 5,002,716 | 3/1991 | Van Dijck | 285/47 X |
| 5,006,185 | 4/1991 | Anthony et al. | 138/151 X |
| 5,022,685 | 6/1991 | Stiskin et al. | 285/45 |
| 5,025,836 | 6/1991 | Botsolas | 138/110 |
| 5,054,513 | 10/1991 | Trueb et al. | 137/375 |
| 5,055,334 | 10/1991 | Lechuga | 137/375 |
| 5,088,772 | 2/1992 | Van Dijck | 285/47 |
| 5,158,114 | 10/1992 | Botsolas | 138/149 |
| 5,163,469 | 11/1992 | Trueb et al. | 137/325 |
| 5,183,299 | 2/1993 | Halberstrom et al. | 285/47 |
| 5,193,786 | 3/1993 | Guenther | 137/375 |
| 5,259,410 | 11/1993 | Trueb et al. | 137/375 |
| 5,266,740 | 11/1993 | Hsu | 174/72 C |
| 5,303,730 | 4/1994 | Trueb et al. | 137/375 |
| 5,341,830 | 8/1994 | Helmsderfer et al. | 137/15 |
| 5,348,044 | 9/1994 | Eugene et al. | 137/312 |
| 5,360,031 | 11/1994 | Trueb et al. | 137/375 |
| 5,369,818 | 12/1994 | Barnum et al. | 4/624 |
| 5,419,364 | 5/1995 | Trueb et al. | 137/375 |
| 5,454,392 | 10/1995 | Trueb et al. | 137/375 |
| 5,503,193 | 4/1996 | Nygaard | 138/149 |
| 5,522,433 | 6/1996 | Nygaard | 138/149 |
| 5,524,669 | 6/1996 | Trueb et al. | 137/375 |
| 5,540,255 | 7/1996 | Trueb et al. | 137/375 |
| 5,564,463 | 10/1996 | Helmsderfer | 137/375 |
| 5,586,568 | 12/1996 | Helmsderfer | 137/15 |
| 5,649,566 | 7/1997 | Helmsderfer | 137/325 |
| 5,701,929 | 12/1997 | Helmsderfer | 137/375 |

COVER ASSEMBLY HAVING RAPID INSTALLATION FEATURES FOR COVERING UNDERSINK PIPING

RELATED APPLICATIONS

This application is a divisional application under 37 CFR 1.60, of prior application Ser. No. 08/742,507 filed on Nov. 1, 1996, for "Cover Assembly Having Rapid Installation Features for Covering Undersink Piping," now U.S. Pat. No. 5,701,929, which application, in turn, is a continuation-in-part application of co-pending U.S. patent application Ser. No. 08/735,132, filed Oct. 22, 1996, and entitled "Cover Assembly with Integral Measurement Indicia for Covering Undersink Piping," now U.S. Pat. No. 5,699,828, which is a continuation-in-part application of co-pending U.S. application Ser. No. 08/490,599, filed Jun. 6, 1995, entitled "Cover Assembly and Method for Covering Undersink Piping," now U.S. Pat. No. 5,685,328, which is a continuation-in-part application of U.S. application Ser. No. 08/337,971, entitled "Cover Assembly and Method for Covering Undersink Piping," filed Nov. 14, 1994, now U.S. Pat. No. 5,564,463, which is a continuation-in-part application of U.S. application Ser. No. 08/271,439 entitled "Cover Assembly and Method for Covering Undersink Piping," filed Jul. 7, 1994, now U.S. Pat. No. 5,586,568, which is a continuation-in-part application of U.S. application Ser. No. 08/146,999, entitled "Cover Assembly and Method for Covering Undersink Piping," filed Oct. 29, 1993, now U.S. Pat. No. 5,341,830; and this application is also a continuation-in-part application of co-pending U.S. application Ser. No. 08/675,779, filed Jul. 15, 1996, entitled "Cover Assembly and Method for Covering Undersink Piping," and now issued as U.S. Pat. No. 5,649,566, which is a divisional application of U.S. application Ser. No. 08/271,439, noted above. The pending applications and issued patents noted above are all incorporated by reference herein in their entireties.

FIELD OF THE INVENTION

This invention relates generally to undersink piping such as P-trap drains and water supply piping, and specifically discloses apparatus to cover and insulate the undersink drain piping to protect a person from abrasions and burns which may be caused by contact with the piping.

BACKGROUND OF THE INVENTION

Conventionally, water which drains from a sink or basin, such as a restroom sink, travels through the drain opening of the sink and empties into undersink piping. The undersink piping directs the water from the sink into the building's waste water system. The undersink drain piping is commonly referred to as a "P-trap" drain assembly, and "P-trap" assemblies are common to many sinks in both commercial and residential applications.

The P-trap assembly generally includes a vertical pipe section which extends downwardly from the sink drain opening and extends below the sink to couple with a J-shaped pipe section. The J-shaped pipe section makes a 180° bend and then extends vertically upward to couple with an L-shaped pipe section which makes a 90° bend from the J-shaped section to extend generally horizontally into the wall to connect the P-trap with the waste water system of the building. The P-trap creates a vapor barrier preventing undesirable vapors from passing back into the building through the drain piping. The J-shaped section also serves the purpose of capturing or trapping any foreign objects which fall down the drain and which may become lodged in the waste water drainage system therefore clogging the system, hence the name "P-trap". Under the force of gravity, any foreign objects will sit in the bottom of the J-shaped section to be subsequently removed, such as by a plumber.

Also extending below sinks are hot and cold water supply pipes commonly referred to as supply water angle valves, which include supply line sections which extend generally horizontally from the wall to connect to a valve and faucet line sections that extend generally vertically upward from the valve to connect to the sink faucet apparatus.

Current building regulations require that restroom facilities in a public building, such as restroom sinks, be accessible to all people, including disabled persons and particularly those disabled persons who must use a wheelchair. Persons in wheelchairs must usually maneuver the chair partially under a restroom sink to access it. Since the water supply pipes and P-trap drain pipes protrude from the wall under the sink, there is a risk of abrasions to the person's legs from the hard piping or even burns from the temperature of the piping caused by the water passing therethrough. The current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to try and adequately cover and insulate undersink P-traps and water supply piping.

In the past, one of the more popular methods of insulation was to utilize loose foam insulation which was wrapped around the piping. However, traditional foam insulation usually fits poorly and is difficult to secure resulting in wasted time and frustration by the plumber or other installer. Furthermore, the foam wrap, due to its poor fit and inadequate securing means, is not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap and supply piping beneath a sink as is evidenced by various patents in the field. For example, U.S. Pat. No. 5,546,463, which is incorporated by reference herein in its entirety, discloses an apparatus for covering a P-trap piping assembly. However, besides having other drawbacks, many of these other devices and methods are still difficult and time consuming to secure and use. For example, many of the prior art devices require that a large number of cuts be made on the device for proper installation. Not only must cuts be made to shape the pieces of the device for installation, but the individual pieces must also be cut and trimmed for a proper fit.

Such cutting and trimming steps and procedures are time consuming and inconvenient, thus making the installation process slow, inefficient and not very cost effective. Furthermore, the cutting and trimming procedures require that the installer have a special cutting tool available. As may be appreciated, given the nature of such devices, many installations will be handled by plumbers who may not have the proper cutting tool readily available, thus further increasing the inconvenience and inefficiency of the installation.

Furthermore, if a proper cutting tool is not available, the installer may try to cut and trim the pieces with some other tool. As such, the insulation device may be damaged or destroyed, thus jeopardizing the insulative and protective properties of the device. Furthermore, the device will not present a pleasant appearance when installed.

Still further, even if a cutting tool is available, care must be taken to make a proper cut around the device, such as to trim it to length. Since such devices generally are not flat, this can present problems as well. The cuts will not be uniform or smooth, and the functionality and aesthetics of the device will be reduced.

Accordingly, there is still a need for a simple and sanitary P-trap cover assembly and method which addresses the shortcomings of the existing devices and methods.

It is therefore an objective of the present invention to provide such a cover assembly and method which addresses the shortcomings of prior art devices, and which is still effective to prevent a disabled person from being burned or bruised and cut by the piping when using a sink.

It is further an objective to provide proper insulation while reducing the complexity of the installation procedure.

It is still another objective to eliminate some of the tools that have been necessary in the past for installation.

It is still another objective to make the installation process faster and more efficient, and therefore, cost effective.

SUMMARY OF THE INVENTION

The above-discussed objectives and other objectives are achieved by the insulative cover assembly of the present invention which insulates a P-trap drain piping assembly located under a sink without requiring any special installation tools and specifically without requiring any special tools for cutting and trimming the insulative cover assembly.

One embodiment of the insulative cover assembly of the present invention comprises a unitary body including a first cover section and a second cover section joined together at a third section. The first cover section has an elongated body terminating in an approximately 180° bend at a first end of that section. The second cover section has an elongated body terminating in an approximately 90° bend at a first end of the second section. The first and second cover sections are coupled together by the third section proximate second ends of each of these cover sections to form the unitary body. The third section includes a structurally weakened area which is manually separateable or dividable without the use of cutting tools or other tools. In that way, the assembly may be shipped as a single piece and the cover sections of the unitary body may be separated by an installer without the use of tools into first and second cover pieces.

The unitary body includes a longitudinal slit thereon such that the first and second cover pieces may be spread apart longitudinally to be positioned over pipes. Once the cover sections of the unitary body have been separated into individual cover pieces, in accordance with the principles of the invention, the first piece having the approximately 180° bend is positioned over the straight and J-shaped pipes of the drain piping assembly which are joined at a juncture. The approximately 180° bend of the first cover piece is positioned proximate the J-shaped pipe. In that way, the first cover piece continuously and simultaneously covers the joined straight and J-shaped pipes, as well as covering the juncture and the associated pipe nut at the juncture. The second cover piece is spread apart along the longitudinal slit and is positioned over the L-shaped pipe and operably couples with the first piece to form a continuous insulative and protective cover over the drain piping assembly.

One embodiment of the invention comprises a unitary body having a circular cross section defined by an extensive, cylindrically-shaped sidewall. The sidewall has a first thickness dimension over a majority of the body, defining the insulative properties of the cover pieces. The structurally weakened area of the third section includes a circumferential sidewall area having a second thickness dimension which is less than the first thickness dimension. The circumferential area is manually separateable, such as by tearing along the thinner sidewall, to separate the cover pieces and provide two cover pieces from the unitary body. The thickness dimension of the circumferential area is such that it is easily tearable. No other tools, and particularly no other cutting tools, are necessary for separating the unitary body into the various cover pieces.

In an alternative embodiment of the invention, the weakened circumferential area includes a series of perforations extending around the unitary body in a circumferential line between the first and second sections. The unitary body may be torn around the perforation line and is separateable along said line for forming first and second cover pieces from the first and second sections of the unitary body. With the perforation line of the invention, the need for cutting tools is also avoided when installing the insulative cover assembly.

Preferably, the thin-walled circumferential area and the perforation line are formed on the unitary body generally in a plane perpendicular to the longitudinal axis of the unitary body to provide even separation of the cover pieces so that the ends thereof are generally flat across the piece rather than angled.

In another embodiment of the invention, the third section includes a plurality of the structurally weakened areas, such as a plurality of adjacent circumferential thin-walled areas or adjacent perforation lines. The weakened areas are spaced at intervals along the length of the unitary body third section to provide for various different separation points. In that way, the cover pieces of the unitary body may be separated at one of a number of positions along the length of the body, depending upon the desired length for each cover piece.

The perforation lines or thin-walled areas are disposed in planes which are generally parallel to one another so that the pieces may also be trimmed during installation. The plurality of weakened areas provides for part of each cover piece to be removed from the end thereof to trim the length of the cover piece during installation. When the unitary body has been divided or separated along one of the weakened areas into the separate cover pieces, one or both of the cover pieces may need to be shortened to provide a proper fit on a pipe. To that end, a small part of the end portion of the cover piece might be removed by separating it from the cover piece along a perforation line of thin-walled area. The weakened areas are manually separated for trimming the length of the pieces without the need for tools.

In another aspect of the present invention, the first ends of each of the cover sections each include enlarged portions or collars covering pipe nuts at the junctures. At the juncture between the L-shaped pipe and the J-shaped pipe of the drain piping assembly, the enlarged end portion on the second section or second piece abuts with the enlarged end portion on the first section or first piece. In that way, the drain piping assembly, including the nuts and junctures, is completely covered and insulated.

To provide for a proper fit between the respective abutting end portions of the pieces, and to account for the various different dimensions of the L-shaped pipe, the straight pipe and the J-shaped pipe, it may be necessary to cut or trim one or both of the ends to vary the effective length of that end. Each end portion of the cover pieces comprises a structurally weakened area which is manually separateable for removing parts of the end portion to adjust the length thereof.

In one embodiment, the sidewall of the enlarged end portion generally has a first thickness and a circumferential area has a second thickness which is less than the first thickness. The second thickness or thinner circumferential area is tearable for separating part of the end portion from the cover piece and adjusting the length of the end portion. Preferably, a plurality of the circumferential thinner areas are positioned at various discreet heights along the enlarged end portion to define a plurality of portions which are separateable from the cover piece.

In another alternative embodiment of the invention, the insulative cover assembly has a series of perforation lines extending circumferentially around the end portion. Discreet sections of the enlarged end portions are separateable from the cover pieces along the perforation lines for trimming the end portions.

The various perforation lines and thin areas which provide for the separation of the cover pieces and subsequent trimming of the ends or enlarged end portions do not degrade the insulative properties of the cover assembly. That is, various thin-walled areas or perforation lines may be left on the cover pieces and the collar, and the cover assembly will still properly cover and insulate the underlying pipes to prevent abrasions and burns. No special tools are necessary for installation, and therefore, the cover assembly may be installed quickly, efficiently and inexpensively. All installation may be done manually.

The above and other objectives and advantages of the present invention shall be made apparent from the accompanying drawings and the description thereof.

BRIEF DESCRIPTIONS OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
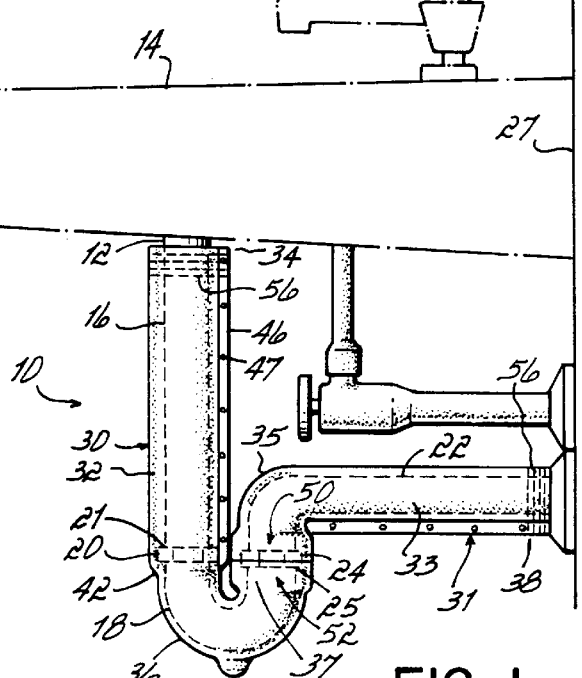
FIG. 1 is a side view of an undersink piping assembly covered with the insulative cover assembly of the invention.

FIG. 1 illustrates the insulative cover assembly 10 of the present invention as installed on a P-trap drain piping assembly 12 underneath a sink 14. The insulative cover assembly 10 is positioned on the drain piping assembly 12 in order to cover and insulate the piping and reduce or prevent burns and abrasions of a handicapped person in a wheelchair coming into contact with the piping. The drain piping assembly 12 under sink 14 essentially comprises three pipes shown by dashed lines. A straight pipe 16 extends downwardly from the sink drain (not shown) and attaches to one side of a J-shaped pipe or "trap" pipe 18, which is attached to straight pipe 16 by a pipe nut 20 at the juncture 21 between the pipes 16, 18. An L-shaped pipe 22 is joined to the other side of the J-shaped pipe 18 by a similar pipe nut 24 at juncture 25. The L-shaped pipe 22 extends back into the wall to dispose of waste water draining from sink 14. Juncture 21 is the forwardmost juncture from the wall 27 which supports sink 14 and piping 12 and thus is referred to herein as a forward juncture. Juncture 25 is a rearward juncture.

The insulative cover assembly 10 includes a first cover piece 30. First cover piece 30 has a generally elongated body with a generally linear portion 32 making up a substantial portion of its length. When the first cover piece 30 is placed over pipes of the drain piping assembly 12, an end 34 of linear portion 32 abuts generally against the bottom of the drain of sink 14 (see FIG. 1).

The other end of the first cover piece 30 terminates in an approximately 180° bend portion 36 which extends from end 38 of the linear portion 32. The first cover piece 30 has a longitudinal slit 40 along its length from the first end 34 of linear portion 32 to an end 37 of the bend portion 36 for being spread apart and positioned over the pipes 16, 18.

A second cover piece 31 covers the L-shaped pipe 22.

Second cover piece 31 has a body including linear portion 33 and terminating in an approximately 90° bend portion 35. The 90° bend portion 35 couples and abuts with end 37 of the first cover piece to cover juncture 25 and thus provides complete insulation of pipe assembly 12. Longitudinal slit 40 allows the second cover piece 31 to be spread apart and installed over the respective pipe in a manner similar to the first cover piece 30.

Figure 2:
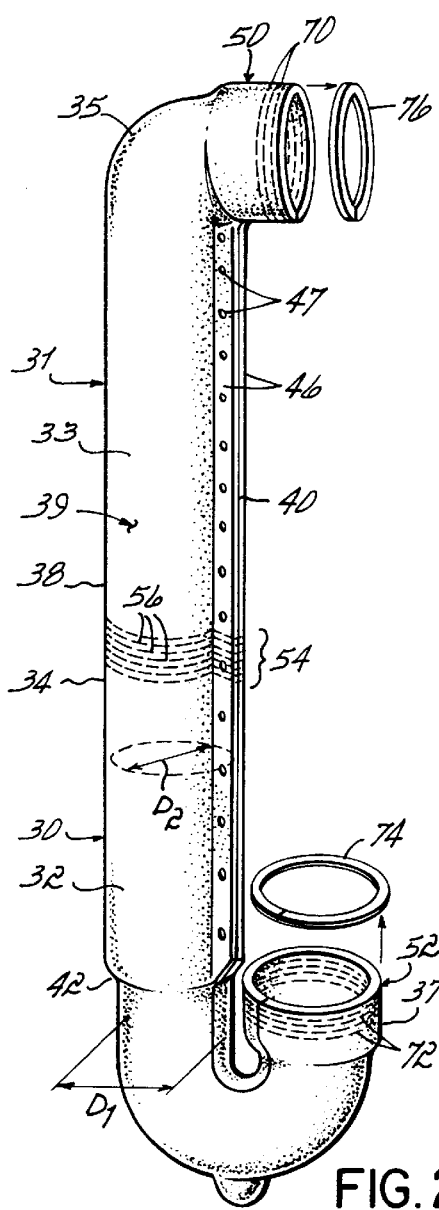
FIG. 2 is a perspective view of an embodiment of the present invention before separation into cover pieces.

FIG. 2 is a perspective view of the first cover piece 30 and second cover piece 31 coupled together to form a unitary body 39. Unitary body 39 may be shipped as shown in FIG. 2 and includes all of the necessary cover pieces for covering and insulating piping assembly 12. The unitary body 39 preferably has a generally circular cross-section for a proper fit on the pipes and is separateable or dividable into the individual cover pieces 30, 31 without the need for special tools as described further below. In that way, installation of the invention is purely manual without the need for special tools, such as cutting tools. The installation may be done quickly, efficiently, and cost effectively.

As illustrated in FIGS. 1 and 2, bend portion 36 of the first cover piece 30 is configured to have an inner diameter $D_1$ which is generally close in dimension to the outer diameter of the J-shaped pipe 18 such that there is very little room for the bend portion 36 to move or shift on the J-shaped pipe 18 when cover assembly 10 is installed. However, the J-shaped pipe 18 is joined to straight pipe 16 by pipe nut 20, which has a larger outer diameter than both the J-shaped pipe 18 and the straight pipe 16. Straight pipe 16 usually has an outer diameter similar to the outer diameter of the J-shaped pipe 18.

To provide proper installation, linear portion 32 of the first cover piece 30 increases to a larger inner diameter $D_2$ at a transition region 42 proximate juncture 21. Linear portion 32 increases from the first diameter $D_1$ of the 180° bend portion to a larger second diameter $D_2$, so that the first cover piece 30 can be positioned over the larger diameter pipe nut 20 and so that cover piece 30 simultaneously and continuously covers pipes 16, 18, pipe nut 20 and juncture 21. Linear portion 32 maintains the increased diameter $D_2$ from transition region 42 up to the end 34 where it joins with the second cover piece 31 to form the unitary body 39 (see FIG. 2). In a preferred embodiment of the invention, transition region 42 is gradually increased in diameter from $D_1$ to $D_2$ to give a smooth appearance.

Second cover piece 31 has the linear portion 33 which maintains the inner diameter $D_2$ until the 90° bend portion 35 where it increases to form an enlarged end portion or collar 50 at an end of the bend. Referring to FIG. 2, the first cover piece 30 also has a collar or enlarged end portion 52 positioned proximate an end of the 180° bend portion 36. Collar 52 is approximately equal in dimension to $D_2$ so that the collar 52 covers juncture 25 and pipe nut 24 as illustrated in FIG. 1. Collar 50 is dimensioned to also have an inner diameter approximately equal to $D_2$ so as to cover nut 24 and juncture 25 and abut against collar 52. When the cover pieces are installed, the enlarged end portions or collars 50, 52 abut against each other. The cover pieces 30, 31 and abutting collars 50, 52 provide complete insulative coverage of the piping assembly.

Unitary body 39 has opposing flanges 46 formed thereon which extend along the length of the body generally along the adjacent linear portions 32, 33 of the cover pieces. Flange 46 includes a series of pairs of apertures 47 formed therein for receiving fastening structures. The apertures 47 of each pair are positioned, one on either side of the longitudinal slit 40, and are axially aligned with each other. When unitary body 39 is separated into the cover pieces as discussed further below, the cover pieces are spread apart in slit 40 to be placed around the respective pipes and are closed around the pipes. Fasteners (not shown), such as cable ties, are placed in the apertures and through each pair and are secured to effectively close the slit 40 and secure the cover pieces.

Referring to FIG. 2, unitary body 39, which comprises the first cover piece 30 and the second cover piece 31, may be shipped and distributed as a single piece and, in accordance with the principles of the present invention, will yield two separate cover pieces 30, 31 which may be configured and trimmed for installation without the need of any special tools, and without the need for any special cutting tool. The present invention provides an efficient and easy installation and thus reduces the labor costs associated with such an installation. To that end, unitary body 39 includes a first section (corresponding to the first cover piece 30) and a second section (corresponding to the second cover piece 31). For reference herein, the first cover piece or first section 30 and the second cover piece or second section 31 will be given similar reference numerals, although the term "section" generally refers to parts of the unitary body 39 while "pieces" refers to the separate cover pieces and measured and formed from the unitary body 39 in accordance with the invention.

Referring again to FIG. 2, third section 54 couples the first and second sections together, and specifically couples end 34 of piece 30 with end 38 of piece 31. For reference herein, the ends 34, 38 will be referred to as second ends for each of the corresponding cover pieces 30,31 while the other ends 35, 36 containing 180° bend portion and the 90° bend portion will be referred to as the first ends of the pieces.

Third section 54 comprises at least one structurally weakened area therein, in accordance with the principles of the present invention, to provide for manual separation or division of the unitary body into separate cover pieces without the use of cutting tools. More specifically, in one embodiment, the structurally weakened area comprises a plurality of perforation lines 56 which extend around the circumference of unitary body 39. The unitary body 39 may be torn apart and divided into the two cover pieces 30, 31 by tearing along one of the perforation lines 56. Furthermore, each of the first and second cover pieces 30, 31 may be trimmed to the proper length utilizing the perforation lines 56 as discussed further hereinbelow.

Figure 4:
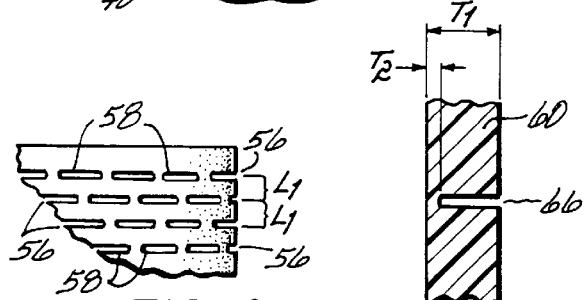
FIG. 4 is an enlarged view of a portion of the embodiment illustrated in FIG. 2.

Referring to FIG. 4, a plurality of perforation lines 56 are formed on the unitary body 39 at chosen intervals or positions along the third section of the body, such as at ⅛ inch intervals $L_1$. Each perforation line 56 is formed by a series of aligned elongated perforations 58 extending circumferentially around the unitary body 39 to form a separation line referenced as a dotted line in FIG. 4. The material forming unitary body 39 is a pliable plastic material such as Plastisol and the individual perforations include small solid portions 59 adjacent thereto which may be easily torn apart for separating the two cover pieces 30, 31. Preferably, the unitary body 39 is manually separated along one of the more centrally located perforation lines 56 to provide for a plurality of additional perforation lines on the respective ends of either cover piece. In that way, each cover piece may be trimmed at its ends utilizing the perforation lines 56.

Referring to FIG. 1, each of the cover pieces will be spread apart along the longitudinal slit 40 and positioned around the respective pipes and closed therearound to be fastened on the pipes such as by fasteners extending through apertures 47. Depending upon the length of the pipes, such as the length of the straight pipe 16 or L-shaped pipe 22, the individual cover pieces 30, 31 may need to be trimmed at the respective ends 34, 38 after they are torn apart into separate cover pieces. To do so, a manual tear is made along another of the perforation lines 56 to remove part of the end of the cover piece, and thus shorten the length of the particular cover piece. Depending upon the adjustment necessary, one or more portions of the piece, as defined by the perforation lines 56, might be removed together (for example see FIG. 6). The perforation lines are formed by small perforations, and thus the insulative properties of the cover pieces will not be affected if the pieces are installed with one or more of the perforation lines still intact.

Figure 3:
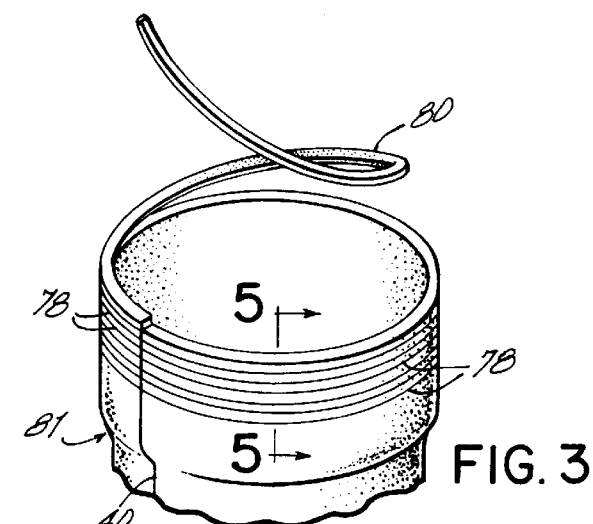
FIG. 3 is a perspective view of an end portion of an embodiment of the invention.
Figure 5:
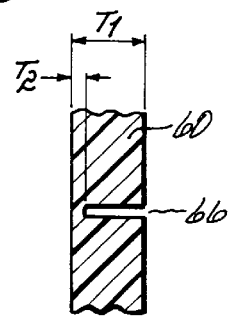
FIG. 5 is a cross sectional view along lines 5—5 of FIG. 3.

While the embodiment of FIGS. 2 and 4 illustrate perforation lines 56, another embodiment is illustrated in FIGS. 3 and 5, wherein the weakened areas include circumferential sidewall areas which are made thinner than the rest of the sidewall for easy manual separation of the pieces without the need for tools. More specifically, each cover piece has an extensive, generally cylindrically-shaped sidewall with a defined thickness dimension $T_1$ for providing proper insulation and coverage of a pipe to prevent burns and abrasions. At certain circumferential areas around the unitary body 39, the sidewall 60 has a lesser thickness dimension $T_2$ to provide structurally weakened areas 66. The thin wall areas 66 each extend completely around the circumference of unitary body 39 to provide for separation of unitary body 39 into cover pieces 30, 31 as discussed hereinabove.

Figure 6:
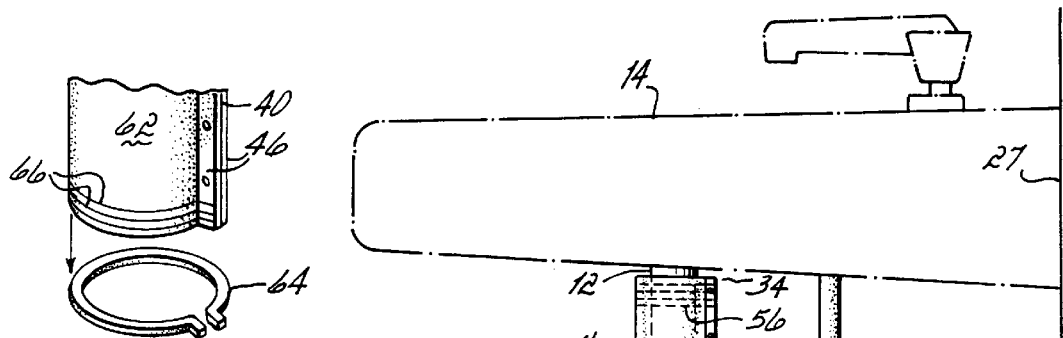
FIG. 6 is a perspective view of an end of a cover piece of the invention.

Thickness $T_2$ is dimensioned so as to provide relatively easy manual separation of the cover pieces by tearing the area 66 apart. The third section 54 of each unitary body preferably includes a plurality of such thin wall circumferential areas 66 for separating the two cover pieces 30, 31 at different positions along the length of the unitary body. As illustrated in FIG. 6, each cover piece, such as cover piece 62, may be trimmed at its end by removing a circumferential portion 64 by separating at one of the circumferential areas 66. As will be appreciated, since the cover pieces are separated along one line, several thin wall lines will remain for trimming the second ends of the cover pieces. In that way, the thin wall areas 66 operate very similar to the perforation lines 56 for separation and trimming of the cover pieces.

As discussed above, the thin wall areas 66 have a dimension $T_2$ which is thick enough to provide proper insulation when the pieces are installed with thin wall areas left thereon. In other words, the thin wall areas do not structurally diminish the insulative properties of the assembly 10 of the invention.

Depending upon the dimensions of the pipes to be covered, it may be necessary to trim abutting end portions or collars 50 and 52 for proper coverage of the piping assembly. In accordance with the principles of the present invention, the end portions 50, 52 also comprise a structurally weakened and manually separateable area for adjusting the length or height of the end portions. Referring again to FIG. 2, end portions 50 and 52 are shown with a plurality of perforation lines formed therein and spaced at intervals, such as ⅛ inch intervals, along the length of the end portions. The perforation lines 70, 72 allow an installer to trim or shorten the length of the abutting end portions to make a proper installation.

As illustrated in FIG. 1, the J-shaped pipe 18, when installed, essentially includes two generally vertically oriented portions on either side of an 180° bend. If the vertical portion adjacent juncture 25 has a relatively long length, the height of end portion 52 may have to be left at its original height. However, if that vertical portion is short, the end portions may need to be trimmed, as illustrated by reference numeral 74. A part of end portion 52 is removed by separating part of the end portion along a structurally weakened area, such as a perforation line 71. The part 74 is peeled off circumferentially and removed (see FIG. 2). One or more portions 74, defined by the perforation lines 72, might also be removed as necessary.

Similarly, the L-shaped pipe 22 may have a relatively long vertical portion requiring that end portion 50 be left at its original length. If the vertical portion of the L-shaped pipe 22 is short, various circumferential parts 76, as defined by the perforation lines 70, may need to be removed, as illustrated in FIG. 2.

The perforation lines 70, 72 are similar to those illustrated in FIG. 4 and discussed hereinabove. As may appreciated the distance $L_1$ between each perforation line may vary depending on how fine the installer will need to adjust the length of the end portions 50, 52 or the lengths of the cover pieces themselves 30, 31. For example, ⅛ inch or ¼ inch spacing, or some other spacing might be used.

In an alternative embodiment of the invention, the end portions may be divided into a number removable circumferential parts by thin wall areas 78, as illustrated in FIGS. 3 and 5 and discussed hereinabove. The circumferential parts 80 of each end portions are then torn away from the end portion 81 at the thin wall areas 78 until the collar is the proper length for installation.

The perforation lines and thin wall areas illustrated in the FIGS. are preferably not connected together but rather are equally spaced along the length of unitary body 39 or the end portions 50, 52. In that way, the ends of the cover pieces are all generally level or flat thereacross to provide proper abutment flat against a wall, sink or another cover piece end. However, an alternative embodiment of the invention might utilize a spirally shaped perforation line or thin wall area wherein the circumferential portion of the piece or end portion removed would be spirally removed starting at an end of the cover piece. When a large enough circumferential part has been removed by spiraling down and around the end portion or cover piece, the circumferential part is ripped away leaving a remaining part of the spiral still on the end portion or cover piece. Therefore, in order to make the adjustment, the installer would simply pull from an end of the collar or cover piece and unwind until the proper amount of material has been removed therefrom.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An insulative cover assembly for insulating a P-trap drain piping assembly located under a sink including a straight pipe, a J-shaped pipe, and an L-shaped pipe joined together at junctures by pipe nuts, the cover assembly comprising:

a unitary body including a first section and a second section joined together as a single piece at a third section, the first section configured to cover a pipe and having a first end, and the second section configured to cover a pipe and having a first end;

the third section coupling second ends of each of the first and second sections together to form said unitary body, the third section comprising a structurally weakened area therein which is sufficiently weakened so as to be manually separateable generally without tools for thereby easily separating the second ends and forming first and second cover pieces from said unitary body;

the first and second sections each including a longitudinal slit thereon for being spread apart and positioned over the pipes when separated into first and second cover pieces;

whereby the piping assembly is quickly and efficiently covered and insulated generally without the need for special installation tools.

2. The insulative cover assembly of claim 1 wherein the unitary body includes a sidewall having a first thickness dimension, the structurally weakened area comprising a sidewall area extending circumferentially around the body and having a second thickness which is less than the first thickness, the sidewall area configured for being manually separateable to divide the unitary body into first and second cover pieces.

3. The insulative cover assembly of claim 1 wherein said first section first end includes an approximately 180° bend portion.

4. The insulative cover assembly of claim 1 wherein said second section first end includes an approximately 90° bend portion.

5. The insulative cover assembly of claim 1 wherein said second cover section comprises an end portion for coupling with an end portion of the first cover section when the unitary body is separated into the first and second cover pieces and positioned on the pipes of the undersink assembly whereby to generally completely cover the undersink assembly.

6. The insulative cover assembly of claim 5 wherein the end portions are configured to abut with each other when the first and second cover pieces are installed on the drain piping assembly.

7. The insulative cover assembly of claim 5 wherein an end portion of one of said first and second sections comprises a structurally weakened area which is sufficiently weakened so as to be manually separateable generally without tools for removing part of the end portion to vary the length of said end portion.

8. The insulative cover assembly of claim 7 wherein the structurally weakened area of the end portion comprises a sidewall area extending circumferentially therearound and having a second thickness which is less than a first thickness of the end portion for manually separating part of the end portion.

9. The insulative cover assembly of claim 7 wherein the structurally weakened area of the end portion comprises a plurality of perforations extending in a generally circumferential line around the end portion, a part of the end portion being manually separateable along said perforation line.

10. An insulative cover assembly for insulating a pipe of a P-trap drain piping assembly located under a sink, the cover assembly comprising:

a unitary body including a first section and a second section joined together as a single piece at ends thereof at a third section, the first and second sections each configured for covering respective pipes of the undersink assembly;

the third section comprising a structurally weakened area therein which is sufficiently weakened so as to be manually separateable generally without tools for thereby easily separating the ends of the first and second sections and forming first and second cover pieces from said unitary body which may be positioned over respective pipes;

whereby the piping assembly is quickly and efficiently covered and insulated generally without the need for special installation tools.

11. The insulative cover assembly of claim 10 wherein said first and second cover pieces each include a longitudinal slit formed therein for being spread apart to position the pieces over the respective pipes.

12. The insulative cover assembly of claim 10 wherein the first section terminates in an approximately 180° bend at another end of said first section, and the second section terminates in an approximately 90° bend at another end of said second section.

13. The insulative cover assembly of claim 10 wherein the body includes a sidewall having a first thickness dimension, the structurally weakened area comprising a sidewall area extending circumferentially around the body and having a second thickness which is less than the first thickness, the side wall area thickness being dimensioned such that the sidewall area is configured for being manually separateable to divide the body into the first and second cover pieces.

14. The insulative cover assembly of claim 10 wherein one of said first and second cover pieces comprises an end portion for coupling with a portion of the other of said pieces when the first and second pieces are positioned over the pipes.

15. The insulative cover assembly of claim 14 wherein said end portion comprises a structurally weakened area which is manually separateable for removing part of the end portion to vary the length of said end portion.

16. The insulative cover assembly of claim 15 wherein the structurally weakened area of the end portion comprises a side wall area extending circumferentially therearound and having a second thickness which is less than a first thickness of the end portion for manually separating part of the end portion.

17. The insulative cover assembly of claim 15 wherein the structurally weakened area of the end portion comprises a plurality of perforations extending in a generally circumferential line around the end portion, a part of the end portion being manually separateable along said perforation line.

18. An insulative cover assembly for insulating a pipe of a P-trap drain piping assembly located under a sink, the cover assembly comprising:

an elongated body having opposing ends, said body terminating in one of an approximately 180° bend and an approximately 90° bend at an end of said body section;

the body further comprising an end portion positioned at an end thereof, the end portion including a structurally weakened area for forming a circumferential part of said end portion which area is sufficiently weakened so as to be manually separateable from the end portion generally without tools for adjusting the length of the body for proper fit on a respective pipe when installed thereon.

whereby the pipe of the piping assembly is quickly and efficiently covered and insulated generally without the need for special installation tools.

19. The insulative cover assembly of claim 18 wherein said end portion includes a sidewall with a first thickness, the structurally weakened area having a second thickness which is less than said first thickness, said second thickness area being manually separateable for separating the circumferential part of the end portion therefrom.

20. The insulative cover assembly of claim 18 further comprising a plurality of structurally weakened areas for separating circumferential parts at discrete lengths along the end portion for selectively varying the length thereof.

* * * * *

UNITED STATES PATENT AND TRADEMARK OFFICE
CERTIFICATE OF CORRECTION

PATENT NO.   : 5,960,820
DATED        : October 5, 1999
INVENTOR(S)  : John A. Helmsderfer It is certified that error appears in the above-identified patent and that said Letters Patent is hereby corrected as shown below:

Column 10,
Line 42, insert after the word "area" the phrase -- thickness being dimensioned such that the sidewall area is --.

Column 12,
Line 42, delete the phrase "area being" and substitute therefor -- dimensioned such that the structurally weakend area is --.

Signed and Sealed this

Twenty-seventh Day of August, 2002

Attest:

Attesting Officer

JAMES E. ROGAN
Director of the United States Patent and Trademark Office